April 14, 1953     E. O. H. HANSSON     2,634,993

KITCHEN MACHINE

Filed Feb. 7, 1948

INVENTOR.
Erik Oskar Helge Hansson
BY
his ATTORNEY

Patented Apr. 14, 1953

2,634,993

UNITED STATES PATENT OFFICE 2,634,993

KITCHEN MACHINE

Erik Oskar Helge Hansson, Stockholm, Sweden, assignor to Aktiebolaget Elektrolux, Stockholm, Sweden, a corporation of Sweden Application February 7, 1948, Serial No. 6,974
In Sweden March 6, 1947

2 Claims. (Cl. 287—119)

This invention relates to kitchen machines, and particularly to those employed for the mixing or other treatments of food products or ingredients of foods. Such machines, powered by an electric motor are often employed for mixing, kneading, whipping, grinding and straining of foods, and include a main driving shaft to which various containers and tools are adapted to be selectively coupled according to the work to be performed by the machine. One of the objects of the present invention is to provide means by which the various containers, tools or other working elements intended to be coupled to the driving shaft, can be more readily and easily connected to said shaft.

Another object of the invention is to provide a coupling means by which a container, feed worm or other working tool can be connected to the drive shaft of the machine by the simple insertion of a stud portion provided on the container, worm or other tool, into a socket provided for its reception, and without the use of tools, whereby easy interchangeability of the several tools intended for use with the machine is attained.

More particularly, the invention contemplates the provision of a drive shaft which is at least in part of tubular or cylindrical form, provided at its end with a socket member or cup of novel internal shape, said socket member or cup having a closed bottom and being of reduced diameter in an area located adjacent to said closed bottom, the remainder of the cup, and particularly the portion which is located adjacent to the open mouth of the same, being of larger diameter, the coupling including a transversely extending pin extending between the walls of the shaft and the cup, said pin being adapted to receive the slotted or bifurcated end of a stud secured to the mixing bowl or other tool intended for coupling to the drive shaft, said stud having parts fitting the two diameters of the cup within which it is fitted when the stud is coupled to the drive shaft.

In the accompanying drawing, wherein an illustrative embodiment of the invention is disclosed:

Figure 1:
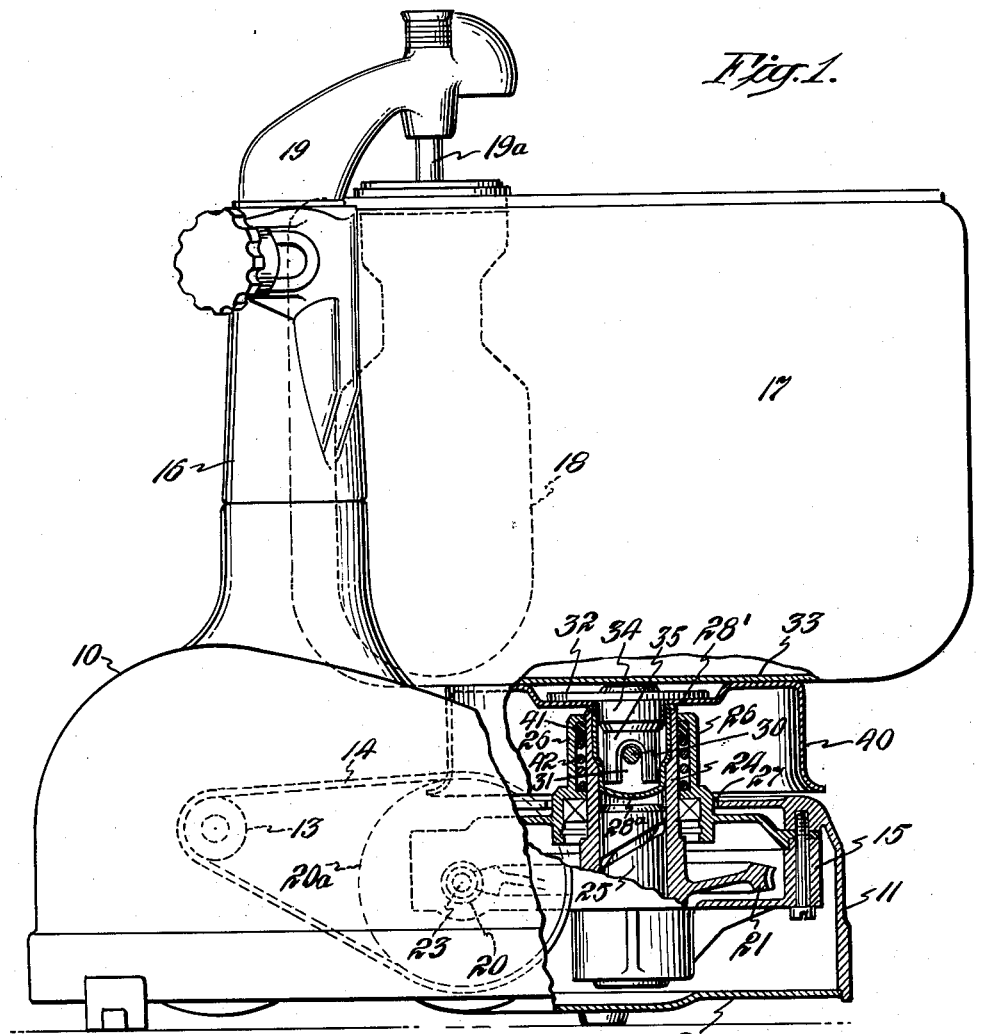
Fig. 1 shows a kitchen machine constructed in accordance with the invention, the same being shown in side elevation, with portions of the housing and mixing bowl broken away, and other parts shown in section.

In the embodiment of the invention shown in the drawing, the casing or housing for the machine is generally indicated at 10, the same including a cover portion or shell 11 normally closed at the bottom by an attached base plate 12. The driving or propulsion means for the drive shaft of the machine is contained within the housing 10, such propulsion means including a pulley 13 on the shaft of an electric motor, a belt transmission 14, and a worm gear housing 15. Arising from the cover portion or shell 11 of the housing 10 is a hollow pillar or standard 16 which supports various auxiliary tools which, when the machine is being used, cooperate with a rotating kettle or bowl 17 adapted to be coupled to the drive shaft 24 in a manner to be explained. In Fig. 1 of the drawing, the auxiliary tool which is operable within the kettle or bowl 17 consists of a roller 18 generaylly maintained in frictional contact with an upper edge portion of the side wall of the kettle or bowl and is rotated through such contact. The arm 19 is pivotally supported in the upper end of the pillar or standard 16, and a spindle 19a, supported at the free end of the arm 19, carries the roller 18. A strong spring contained within the pillar or standard 16 normally tends to maintain the arm 19 in such a manner that the roller 18 is urged toward the wall of the kettle or bowl 18 to establish frictional contact therewith, as above explained.

The worm gear drive for the drive shaft 24 includes a worm 20 on shaft 23, on which shaft is secured the pulley 20a driven by the belt 14. Worm 20 engages and drives a gear 21 from which the tubular drive shaft 24 extends. At its lower end, the shaft 24 is supported on a pin 25 connected to the gear 21, and at the top by a collar 26, the latter forming a part of the top portion of the gear housing 15. The collar 26, together with the portion of the tubular drive shaft 24 which it surrounds, extends upwardly through an opening 27 provided in the top of the cover or shell 11. Fitted in the upper free end of the tubular drive shaft 24 is a cup-shaped sleeve liner 28 having a closed bottom 28a and provided at its open end with a radially extending flange 28'. This liner or cup is preferably made from stainless steel or other non-corrosive metal and is pressed in place within the tubular drive shaft 24 and becomes, for all intents and purposes, a part of the drive shaft. The sleeve liner or cup 28 receives a transversely-extending coupling pin 30, which passes through the same and also through the wall of the drive shaft 24.

Figure 2:
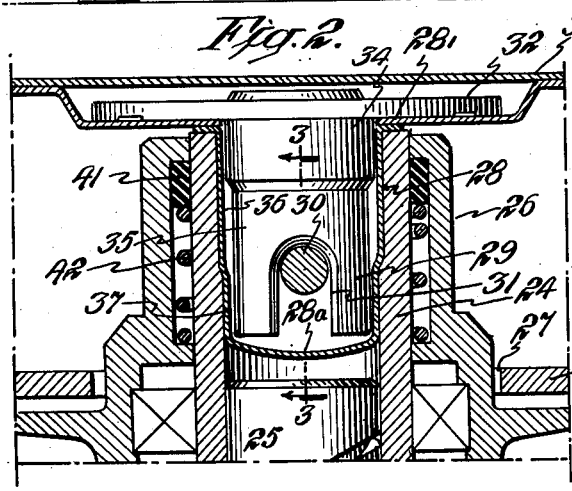
Fig. 2 is an enlarged fragmentary vertical sectional view of the drive shaft and coupling between the same and one of the attachments.

The sleeve liner or cup 28 constitutes a socket member for the reception of a stud 29 provided at its upper end with a flange 32 connected to the bottom 33 of the kettle or bowl 17 by spot welding or other equivalent means. The stud 29 is bifurcated or provided in its free end with a transverse slot 31 which, when the stud 29 is fitted within the cup-shaped liner 28, fits over the coupling pin 30, as shown in Figs. 1 and 2, to thereby establish a coupling between the bowl or kettle 17 and the tubular drive shaft 24. Hence, when the drive shaft 24 is rotated by means of the propulsion means described, it will be apparent that the bowl or kettle 17 will be rotated also.

It is desirable that the insertion of the stud 29 within the cup-shaped liner 28 be facilitated, and therefore the interior shape of the cup 28 and the shape of the stud 29 to correspond therewith is arranged to enable the parts to be placed in coupled relation and also uncoupled with relatively little effort. It will be observed that the stud 29 is provided, adjacent to the flange 32, with a larger-diameter portion 34, the lower portion of the stud, or that situated adjacent to the transverse slot 31, being of smaller diameter, as indicated at 35. The sleeve-liner or cup 28 is formed with a larger internal diameter in its upper portion or that adjacent to its mouth, as indicated at 36, while the lower portion of the sleeve or cup, or that situated adjacent to the closed bottom 28a of the sleeve and indicated at 37, is of smaller diameter. With the described arrangement, the stud 29 will rest against and be guided by the sleeve or cup 28 only at the lower end thereof and at the top portion thereof. It is to be noted that the narrower diameter part 35 of the stud 29 is longer than the narrower diameter portion 37 of the sleeve 28, while the wider diameter part 34 of the stud 29 is shorter than the under portion 36 of the sleeve 28. With such construction the fit of the stud 29 within the sleeve can be snug and yet the possibility of the pin sticking within the sleeve and being difficult to remove, is remote. Also, the stud 29, due to the fact that it engages the sleeve at only two spaced apart points or regions, will not be inclined to lean due to pressure imposed by the roller 18 against the kettle or bowl 17 so that wear and tear imposed on the coupling members will be greatly reduced. To cover and protect the coupled connection between the drive shaft and bowl or kettle 17, a protective skirt 40 may be provided on the bowl or kettle, as clearly shown in Fig. 1. A packing 41, maintained in proper position by a spring 42, is located between the collar 26 and the tubular drive shaft 24.

From the foregoing, the operation of the described structure will be readily apparent. The bowl or kettle 17, or other tools or elements adapted to be coupled to the drive shaft 24 of the machine in the various uses of the machine, are readily coupled to the drive shaft by the simple insertion of the stud portion 29 provided on each of said tools or appliances, into the socket member or sleeve 28. The "stepped" arrangement of the stud 29 and the complementary internal shape of the cup or socket member aids in guiding the stud into the socket and facilitates the engagement of the slot 31 with the transverse coupling pin 30. Hence, the insertion and removal of the stud 29 in the socket or sleeve 28 is readily effected, and the imposition of pushing force to insert the stud in place, and the use of extreme pulling force to remove or disengage it from the socket or sleeve is wholly obviated. When the parts are coupled as above described, a snug fit between the same ensues, and play or wobble of the bowl or kettle or other coupled appliance is completely absent.

Figure 3:
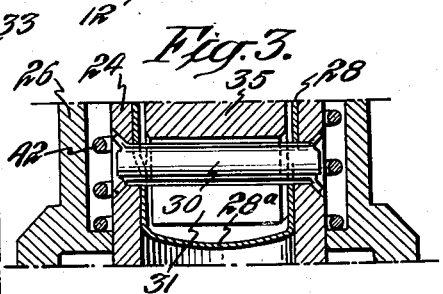
Fig. 3 is an enlarged fragmentary sectional view, taken on the line 3—3 of Fig. 2, looking in the direction of the arrows.

More particularly, it will be seen that the cup-shaped liner 28 forms a tubular member which fits into the hollow section at the extreme upper end of shaft 24 which is readily accessible. The stud 29 depending downwardly from the bottom of the vessel 17 constitutes a driven shaft having a part which telescopically fits within the tubular member 28. A pin 30 held in the hollow section of the shaft 24 passes through diametrically opposed apertures in the cup-shaped socket 28 adjacent to the closed end thereof, as best seen in Fig. 3.

The stud 29, when in telescopic relation with the tubular member 28, includes an outer portion 35 adjacent the slot 31 which engages an inner end portion 37 of the tubular member 28 axially separated from a larger outer end portion 36 of the tubular member. Further, the stud 29 includes a larger inner portion 34, axially separated from the extreme end of the outer portion 35, which engages the larger outer end portion 36 of the tubular member 28. In addition, the intermediate regions of the stud 29 and tubular member 28 are spaced apart, as best seen in Fig. 2, to provide a gap having an axial extent which enables the stud 29 to be easily fitted telescopically within the tubular member 28 and detached therefrom while providing a snug fit therebetween which is substantially free of play when the stud 29 and tubular member 28 are in telescopic relation.

In addition, the tubular or cup-shaped member 28 is formed with an outwardly flaring rim 28' at the open end thereof which overlies the extreme upper end of the hollow section of the vertical shaft 24. The stud 29 at the bottom of the vessel 17 has a horizontally extending element fixed thereto which bears downwardly upon the rim 28' of the tubular or cup-shaped member 24 when the stud 29 and member 28 are in telescopic relation and the open-ended slot 31 at the end of the stud receives the pin 30.

While I have described one embodiment of the invention, it is obvious that the same is not to be restricted thereto, but is broad enough to cover all structures coming within the scope of the annexed claims.

What I claim is:

1. Means for detachably connecting a rotatable driving shaft of a machine of the character described and a driven shaft of a member adapted to be driven by the machine, one of the shafts having a hollow section into which access may be had at the extreme end of such shaft, said means comprising a tubular member fitting in the hollow section of said one shaft and a part at the end of said other shaft which telescopically fits within the tubular member, the wall of the tubular member having an apertured region, a pin which is held in the hollow section of said one shaft and received by the apertured region of the tubular member, the part, when in telescopic relation with the member, having an outer portion which engages an inner end portion of the tubular member axially separated from a larger outer end portion of the member and also having a larger inner portion, axially separated from the outer end portion thereof, which engages the larger outer end portion of the tubular member while the intermediate regions of the part and tubular member between the axially separated portions thereof are spaced apart to provide a gap having an axial extent which enables the part to be easily fitted telescopically within the tubular member and detached therefrom while providing a snug fit therebetween which is substantially free of play when the part and tubular member are in telescopic relation, and the part having an open-ended slot at the extreme outer end thereof to receive the pin when the part and tubular member are in telescopic relation.

2. Detachable connecting means as set forth in claim 1 in which the driving and driven shafts constitute said one and other shafts, respectively, and in which the driving shaft is vertically disposed and provided with the hollow section at the extreme upper end thereof, said dettachable connecting means including said tubular member which is cup-shaped and formed with diametrically opposed apertures adjacent to the closed end thereof which receive the pin, the cup-shaped member having an outwardly flaring rim at the open end thereof which overlies the extreme upper end of the hollow section of the driving shaft, and the part at the end of the driven shaft having a horizontally extending element which bears downwardly upon the rim of the cup-shaped member when the part and member are in telescopic relation and the open-ended slot at the end of the part receives the pin.

ERIK OSKAR HELGE HANSSON.

References Cited in the file of this patent

UNITED STATES PATENTS

| Number | Name | Date |
|---|---|---|
| 1,648,200 | Schulze | Nov. 8, 1927 |
| 1,820,677 | Rataiczak | Aug. 25, 1931 |
| 2,191,304 | Ashendorf | Feb. 20, 1940 |
| 2,198,826 | Lansing et al. | Apr. 30, 1940 |

FOREIGN PATENTS

| Number | Country | Date |
|---|---|---|
| 47,097 | Denmark | of 1933 |